United States Patent Office 3,285,947
Patented Nov. 15, 1966

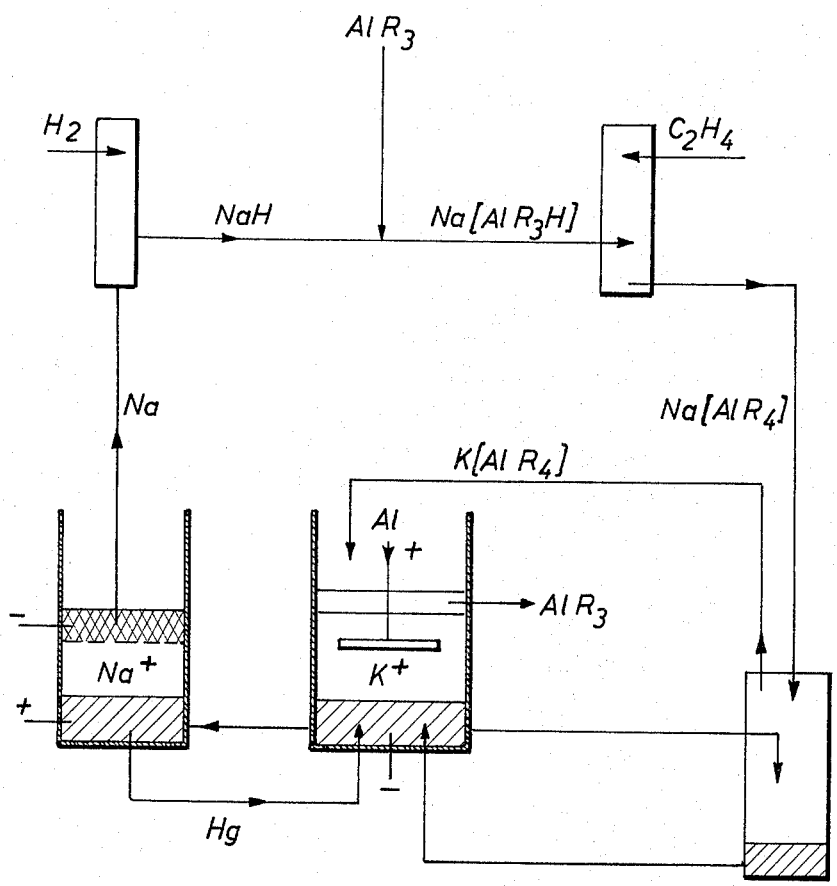

3,285,947
PROCESS FOR THE CONVERSION OF COMPLEX ALUMINUM-ORGANIC AND BORON-ORGANIC COMPOUNDS OF SODIUM INTO THOSE OF POTASSIUM
Karl Ziegler, 1 Kaiser Wilhelm Platz, Mulheim an der Ruhr, Germany, and Herbert Lehmkuhl, Mulheim an der Ruhr, Germany; said Lehmkuhl assignor to said Ziegler
Continuation of application Ser. No. 114,939, June 5, 1961. This application Oct. 29, 1963, Ser. No. 320,607
Claims priority, application Germany, June 7, 1960, Z 8,056; May 2, 1961, Z 8,715
5 Claims. (Cl. 260—448)

This application is a continuation of application Serial No. 114,939, filed June 5, 1961, and now abandoned.

This invention relates to a process for the conversion of complex aluminum-organic and boron-organic compounds of sodium into those of potassium.

Complex aluminum-organic and boron-organic compounds of sodium and potassium have gained commercial importance as electrolytes for the electrolytic production of certain metal alkyls, especially of tetraethyl lead. Examples of complexes of this kind include

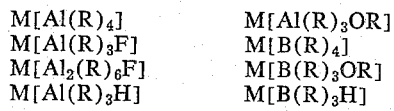

wherein M is sodium or potassium and R is, for example, the radical $-C_2H_5$. The potassium compounds have more valuable properties in many respects than the sodium compounds. In particular, their conductivity is higher and the heat resistance of the complex

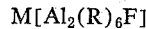

is higher with M=potassium than with M=sodium. It is, for example, a result of this latter difference that an electrolyte consisting of or containing such a complex compound can be freed very smoothly from any tetraethyl lead simultaneously present by heating under vacuum if M is potassium but not in the case where M is sodium. Some aluminum triethyl is also split off in the operation mentioned above and, therefore, no pure tetraethyl lead is obtained as the distillate.

It often is found to be desirable in the practical use of the complex compounds mentioned above to convert the sodium compounds into the potassium counterparts. This may, for example, be even important if nothing else is intended than to produce a potassium aluminum tetraalkyl or potassium boron tetraalkyl. One possibility of achieving this is the treatment of an aluminum trialkyl with metallic potassium, which substantially proceeds according to the following equation:

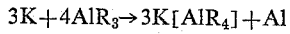

Potassium aluminum tetraalkyl produced in this manner has been found to contain always certain impurities which can be removed only with great difficulties by recrystallization. The raw product of the reaction is brown-colored and can hardly be obtained completely colorless by the purification.

The analogous action of sodium on, for example, aluminum triethyl proceeds much smoother and results in pure sodium aluminum tetraethyl without any difficulty. When subsequently exchanging the sodium for potassium, a colorless product is obtained without difficulties.

This exchange was initially effected by stirring with metallic potassium or with dry potassium chloride. However, it has been found that the exchange is never complete. When stirring with metallic potassium, sodium will be liberated. The latter forms an alloy with potassium and the result hereof is that finally hardly more than 80 mol percent of potassium compounds in addition to 20 mol percent of sodium compound are present in the final product. Moreover, the establishment of equilibrium which is obviously present takes an extended period of time. The same result is obtained when stirring with potassium chloride.

It has now been observed in accordance with the invention that the exchange of sodium for potassium occurs extremely rapidly and proceeds substantially to completion if potassium metal in the form of potassium amalgam is used. This result could by no means be predicted because the heat of formation of potassium amalgam, according to literature, is 26.06 kg. cal./mol and higher than that of sodium amalgam which is 19.80 kg. cal./mol for the composition $MHg_{50}$. This result is further surprising because, in an aqueous medium and in an exactly reverse manner, K salts can be converted into Na salts and potassium amalgam by treatment with sodium amalgam.

In a similar manner, other complex compounds, especially those of sodium fluoride, can also be converted into the corresponding potassium compounds. However, there would hardly be sense in such a measure if nothing else would be intended than to produce compounds of the type $K[Al(C_2H_5)_3F]$ or $K[Al_2(C_2H_5)_6F]$, it being much simpler to fuse directly together potassium fluoride and aluminum triethyl in appropriate relative amounts. Complications of the type mentioned above in connection with metallic potassium will not be encountered. However, the conversion effected in accordance with the invention by means of potassium amalgam offers considerable advantages in a different connection:

If the electrolytic production of a metal alkyl, e.g., of tetraethyl lead, is effected in accordance with the applicant's suggestions by means of an electrolyte which consists of a mixture of $K[Al(C_2H_5)_4]$ and $K[Al(C_2H_5)_3F]$, then $K[Al_2(C_2H_5)_6F]$ in addition to tetraethyl lead is formed at the lead anode to be used. When operating with a mercury cathode, potassium amalgam is formed at this cathode. The separation of tetraethyl lead from such an electrolyte which contains only potassium as the cation is extremely simple according to what has been stated above. The electrolyte must be regenerated in the commercial production of tetraethyl lead. When charging sodium compounds, the regeneration is effected by a treatment with sodium hydride and ethylene thereby reconverting the $Na[Al_2(C_2H_5)_6F]$ into $Na[Al(C_2H_5)_3F]$ and into sodium aluminum tetraethyl. If, in the case of operating with potassium compounds, the electrolyte is desired to be restored to the initial state, the regeneration would have to be effected with potassium hydride+ethylene. Potassium hydride can only be obtained from potassium metal. However, potassium metal is not produced on a large scale and, therefore, is disproportionately expensive. It also is not possible to separate from the potassium amalgam formed at the cathode the potassium in a form suitable for the production of the hydride.

The process of the invention permits the solution of the problem of the regeneration of the electrolyte in a simple manner by effecting the regeneration with the cheap sodium hydride+ethylene and subsequently reconverting the sodium content thereby introduced into the electrolyte into a corresponding content of potassium by a treatment with the potassium amalgam formed in the electrolysis. Metallic sodium as it is required for the formation of sodium hydride can either be obtained from sodium amalgam by a secondary electrolysis or this amalgam can be processed to form sodium hydroxide. In any case, it is achieved in the manner described above that, within the production of tetraethyl lead, all of the advantages of the use of the complex compound containing only potassium as the cation can be utilized while cheap sodium and its hydride+ethylene are sufficient now as before to effect the regeneration.

Accordingly, when regenerating the electrolyte in the process described above, a mixture of

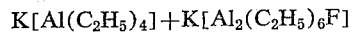
$$K[Al(C_2H_5)_4]+K[Al_2(C_2H_5)_6F]$$

is continuously converted with sodium hydride into a mixture of

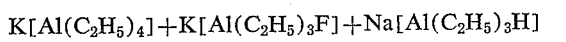
$$K[Al(C_2H_5)_4]+K[Al(C_2H_5)_3F]+Na[Al(C_2H_5)_3H]$$

This is followed in the embodiment described above by a treatment with ethylene, thereby converting the complex standing at the third place into $Na[Al(C_2H_5)_4]$, whereupon the exchange of sodium for potassium takes place. It is obvious that in this case the order of the two operations, i.e. the treatment with ethylene and the exchange, can also be reversed. In this case, the mixture of the three complex salts is first converted into the mixture

$$K[Al(C_2H_5)_4]+K[Al(C_2H_5)_3F]+K[Al(C_2H_5)_3H]$$

and this mixture is treated with ethylene. This variant offers certain though only small advantages over the process described first because the saturation of the last traces of hydride by ethylene proceeds somewhat easier in the potassium compounds than in the sodium compounds.

According to earlier suggestions made by the applicant an advantageous synthesis of aluminum triethyl is also possible when electrolyzing sodium aluminum tetraethyl with the use of aluminum anodes and a mercury cathode. In this case, ¾ of the anodically formed aluminum triethyl are reconverted with sodium hydride and ethylene into the electrolyte and ¼ is withdrawn as production. This process, which in itself is very advantageous, can also be further improved by changing over to potassium aluminum tetraethyl as the electrolyte because of the increase in electrolytic conductivity connected therewith. However, it appeared in this case that aluminum triethyl is not completely stable to potassium amalgam.

In this case an exchange is preferably effected during the electrolysis between the amalgam which is formed in the electrolysis and which is recycled and the electrolysis regenerate containing sodium cations, the exchange being effected such that the potassium content in the mercury of the electrolytic cell is maintained as low as possible. It should not exceed 0.1%, still better 0.01%. Although the electrolysis itself is operated in this case in a medium without sodium ions, a low percent sodium amalgam is preferably present at the cathode. This is illustrated by the annexed drawing.

The same procedure may also be applied with advantage in all those embodiments of the electrolysis where aluminum triethyl occurs commonly with other metal alkyls at the anode.

This variant entails a further advantage in the above-described electrolytic synthesis of tetraethyl lead by electrolysis of a mixture of potassium aluminum tetraethyl and complex potassium aluminum fluoride since, when operating this electrolysis for an extended period of time with continuous recycling of the mercury into the electrolytic cell, the mercury is also capable of taking up minor traces of lead by an analogous decomposition of the tetraethyl lead, which finally may result in an enrichment of lead and mercury and entail the necessity of freeing the mercury from lead from time to time in a separate operation. This introduction of lead into the mercury is much lesser with sodium amalgam than with potassium amalgam.

It is, of course, necessary in case of these embodiments involving as rapid as possible an exchange of potassium for sodium in the amalgam with recycling of a sodium-containing mercury into the electrolytic cell that a partial stream of the mercury is split off for continuously removing the alkali metal from the mercury and recycling alkali metal-free mercury into the cycle because otherwise the total alkali metal content would assume inadmissibly high values. It is easy to understand that, when proceeding in this manner, losses of potassium from the entire system can only be avoided if the residual potassium from the branched-off partial stream is completely replaced by sodium in a further exchanger. The removal of sodium from the split-off partial stream may then be effected either by hydrolysis with formation of NaOH or in known manner by a second electrolysis in which the amalgam constitutes the anode and sodium metal is deposited at the cathode. As was already mentioned, the process of the invention is not only suited for the exchange described on aluminum-organic complex compounds but also on corresponding boron-organic complex compounds. Therefore, in a further embodiment of the invention, corresponding complex sodium-boron-organic compounds, in addition to or especially in place of the above-mentioned complex aluminum compounds, are treated with potassium amalgam and converted into the complex potassium-boron compounds with the simultaneous formation of sodium amalgam. In this connection, the process of the invention is of particular importance for the production of the boron complex compounds $K[BR_4]$, $K[BR_3H]$, $K[BR_n(OR')_m]$ wherein R and R' are hydrocarbon radicals, especially alkyl radicals, and $n$ and $m$ are preferably integers from 0 to 4 and the sum of $n+m$ is 4.

EXAMPLE 1

42 gms. (=0.25 mol) of $NaAl(C_2H_5)_4$ and 1940.25 gms. of a 0.5% potassium amalgam containing 9.75 gms. (=0.25 mol) of potassium are thoroughly stirred for 2 minutes at 140° C. under an inert gas atmosphere in a 250 ml. round-bottom flask. Then the amalgam is allowed to settle at this temperature and the supernatant clear melt of the complex salt is siphoned under nitrogen pressure into a dry glass flask filled with inert gas. The reaction product (45 gms.) is identified as pure potassium-aluminum tetraethyl by the melting point (M.P.=76–78° C.) and the following analysis:

K—Found: 21.0%. Calculated: 21.4%
Al—Found: 14.72%. Calculated: 14.84%
$C_2H_5$—Found: 62.4%. Calculated: 63.8%

After cooling, the amalgam was repeatedly washed with dry benzene and analyzed after having sucked off the last portions of benzene. The amalgam contained 0.25 mols of alkali metal which consisted of 99% sodium and only less than 1% potassium. The small residual content of potassium is due to the fact that equivalence of the reactants was aimed at in this experiment. However, experience has taught that exact metering of the highly air-sensitive alkali complex salts is very difficult. It can be shown very easily that the sodium can be completely exchanged with some excess potassium amalgam (cf. Example 2) or that the potassium can be completely removed from the mercury with some complex compound containing excess sodium.

EXAMPLE 2

1157 grams of a complex salt mixture comprising 650 gms. (3.5 mols) $KAl(C_2H_5)_4$, 258 gms. (1.5 mols) $KAl(C_2H_5)_3F$ and 249 gms. (1.5 mols) $NaAl(C_2H_5)_4$ are intensively stirred for 1 hour at 100° C. with 9935 gms. of a 0.65% potassium amalgam (containing 64.5 gms.=1.65 mols of potassium) in a dry reaction vessel of iron filled with inert gas (capacity, 3000 ml.). The amalgam is then allowed to settle and the supernatant clear complex salt melt is siphoned into a second dry vessel filled with inert gas.

The complex salt now contained no longer a trace of sodium. Even the extremely sensitive examination for $Na^+$ by the development of a yellow color of the flame of a Bunsen burner which had been made nonluminous had a negative result. Only the development of a red-violet color in the flame by $K^+$ could be observed, which color is otherwise masked by an intensive yellow color even if only traces of $Na^+$ are present.

The amalgam is analyzed after having been washed with benzene. It contains 34.5 gms. (1.15 mols) Na and 5.9 gms. (0.15 mol) potassium. The result of the analysis corresponds to a quantitative conversion since an excess of 10 mol-percent, i.e., 0.15 mol of potassium was used.

In exchange experiments with larger amounts of the compounds it is very advantageous to pass the amalgam containing potassium and the complex salt melt containing $Na^+$ ions through a suitable apparatus in countercurrent flow relation. The countercurrent apparatus used may, for example, be a packed reaction tower in which the molten salt rises from below while the potassium amalgam flows through in downward direction. When proceeding in this manner, the amalgam is finely distributed in the complex salt melt so that an extremely rapid exchange is achieved. As an alternative, it is easily possible to operate with exchangers which are arranged in an approximately horizontal position, e.g., with exchangers in which a mercury film is flowing at the bottom. In a manner analogous to that described in Example 1, the complex compounds $Na[Al(R)_4]$;

$$Na[Al(R)_3H]$$

such as $Na[Al(C_2H_5)_3H]$; $Na[Al(R)_3OR']$ such as $Na[Al(C_2H_5)_3OC_2H_5]$ or $Na[Al(C_4H_9)_3OC_4H_9]$ or $$Na[Al(CH_3)_3OC_{10}H_{21}]$$

$Na[Al(R)_3X]$ or $Na[Al_2(R)_6X]$ such as $$Na[Al_2(C_2H_5)_6CN]$$

or $Na[Al_2(C_2H_5)_6N_3]$ are converted into the analogous potassium compounds by intensive stirring with equimolar amounts of potassium amalgam at temperatures of between 50° and 140° C. The potassium compounds were identified by analysis.

The lower limit of the temperatures during the exchange is only set by the solidification points of the complex salts used while the upper limit is determined by the fact that the decomposition temperatures of the complex salts must not be exceeded. The lower temperature limits can be lowered by the addition of suitable solvents. The decompositio ntemperatures in most cases range above 200° C. so that the allowable temperature range can be defined as being about 0–250° C. which, however, is only to be understood as a general guidance rather than an obligatory restriction. It will not be necessary in general to operate in the presence of solvents and, similarly, it will be possible in general to dispense with excessively high temperatures. Convenient in practice is the range between about 50° and 150° C.

EXAMPLE 3

In a 250 ml. round-bottom flask, 37.5 gms. (0.25 mol) $NaB(C_2H_5)_4$ are intensively stirred for 2 minutes at 160° C. with 1940 gms. of a 0.5% potassium amalgam containing 9.75 gms. (0.25 gram-atoms) of potassium, the stirring being effected under an inert gas atmosphere. The amalgam is then allowed to settle at this temperature and the supernatant clear melt of the complex salt is siphoned under nitrogen pressure into a dry glass flask filled with inert gas. The reaction product (40 gms.) is identified as pure $KB(C_2H_5)_4$ by the melting point (M.P. 159° C.) and the following analysis:

K—Found: 23.1%. Calculated: 23.5%
B—Found: 6.3%. Calculated: 6.5%

After cooling, the amalgam was repeatedly washed with pure benzene and, after having sucked off the last portions of benzene, analyzed. The amalgam contained 0.25 g.-atoms of alkali metal which consisted of 98% sodium and only about 2% potassium. The small residue of potassium is due to the fact that, with equivalence of the reactants aimed at, exact metering of the highly air-sensitive alkali complexes is very difficult. It can be shown very easily, however, that the sodium can be completely exchanged in the complex with some excess potassium amalgam (cf. Example 4) and that the potassium can be completely removed from the mercury with a minor amount of complex compound containing excess sodium.

EXAMPLE 4

122 gms. (1 mol) $NaB(C_2H_5)_3H$ are stirred for 5 minutes at 100° C. with 7700 gms. potassium amalgam containing 0.65% potassium in a dry reaction vessel filled with inert gas. Following this, the amalgam is allowed to settle and the supernatant clear complex salt melt is siphoned into a second dry container filled with inert gas.

The complex salt was pure $KB(C_2H_5)_3H$ and contained no longer a trace of sodium. Even the extremely sensitive examination for Na by the development of a yellow color in the flame of a Bunsen burner which had been made nonluminous had a negative result. Only the development of a red-violet color in the flame by K could be observed, which color is otherwise masked by an intensive yellow color even if only traces of Na are present.

In exchange experiments with larger amounts of the compounds it is very advantageous to pass the amalgam containing potassium and the complex salt melt containing Na ions through a suitable apparatus in countercurrent flow relation. The countercurrent apparatus used may, for example, be a packed reaction tower in which the molten salt rises from below while the potassium amalgam flows through in downward direction. When proceeding in this manner, the amalgam is finely distributed in the complex salt melt so that an extremely rapid exchange is achieved.

EXAMPLE 5

94 gms. (1 mol) $NaB(CH_3)_4$ are dissolved in 100 ml. dry tetrahydrofurane and intensively stirred for 5 minutes at 70° C. with 10,000 gms. of a 0.5% potassium amalgam. After having allowed the amalgam to settle, the solution of the complex is siphoned off and the tetrahydrofurane is distilled off. Pure $KB(CH_3)_4$ in amount of 110 gms. (1 mol) is obtained.

EXAMPLE 6

The procedure is the same as in Example 5 except that a solution of 110 gms. $Na(CH_3)_3BOCH_3$ in 100 ml. tetrahydrofurane or a solution of 236 gms. (1 mol) $Na(CH_3)_3BOC_{10}H_{21}$ in 150 ml. tetrahydrofurane is stirred with 10,000 gms. of a 0.5% potassium amalgam. Processing in a manner analogous to that described in Example 5 results in 126 gms. $K(CH_3)_3BOCH_3$ or 252 gms. $K(CH_3)_3BOC_{10}H_{21}$ which were both identified by analysis.

EXAMPLE 7

20.6 gms. $NaB(C_3H_7)_4$ (0.1 mol) are dissolved in 50 ml. diethyl ether and intensively stirred for 40 minutes at room temperature with 1000 gms. of a 0.4% potassium amalgam. The solution of the complex is freed from tetrahydrofurane at as low a temperature as is possible (about 60 to 70° C.). The residue from distillation is 22 gms. (0.1 mol) $KB(C_3H_7)_4$.

As illustrated in the drawing essentially representing a flow sheet, the following operational steps are apparent. Aluminum trialkyl is reacted with sodium hydride to form sodium aluminum trialkyl hydride, which is passed into a reaction chamber to be there converted with ethylene into the corresponding sodium aluminum tetraalkyl compound, which is reacted with potassium amalgam continuously derived from the bottom of the potassium electrode chamber, the potassium from said amalgam giving off its potassium to form potassium aluminum tetraalkyl, the replaced sodium from the sodium aluminum tetraalkyl being taken up by the mercury to form sodium amalgam. The potassium aluminum tetraalkyl has then passed into an electrolysis chamber in which aluminum trialkyl is formed, the potassium being taken up in mercury to form potassium amalgam and the mercury being continuously fed into said electrolysis chamber from a second electrolysis chamber to which continuously sodium amalgam resulting from the conversion of sodium aluminum tetraalkyl to potassium aluminum tetraalkyl is continuously passed, the sodium being cathodically removed from said second electrolysis chamber whence it is continuously brought into a reactor into which hydrogen is fed resulting in the formation of sodium hydride, which is then again converted with further amounts of trialkyl aluminum to the sodium aluminum trialkyl hydride to repeat the cycle of operations. Thus, by the use of hydrogen aluminum trialkyl and metallic aluminum there is continuously obtained in an efficient manner trialkyl aluminum.

We claim:

1. A process for the production of potassium-organo-complex compounds of an element selected from the group consisting of aluminum and boron from the corresponding organo-complex compounds of sodium which comprises reacting in an inert atmosphere a sodium-organo-complex compound selected from the group consisting of $Na[Al(R)_4]$, $Na[Al(R)_3H]$, $Na[Al(R)_3OR']$, $Na[Al(R)_3F]$, $Na[Al_2(R)_6F]$, $Na[B(R)_4]$, $Na[B(R)_3H]$, $Na[BR_n(OR')_m]$ and mixtures thereof wherein R represents an alkyl radical containing 1–4 carbon atoms and R' represents an alkyl radical containing 1–10 carbon atoms, and $n$ and $m$ are integers from 0 to 4 with the proviso that $n+m=4$ with a potassium amalgam liquid under the reaction conditions and recovering the so-formed potassium-organo complex compound from the reaction mixture.

2. Process according to claim 1 wherein said reaction is effected at a temperature of about 50–140° C. with intensive stirring of said potassium amalgam and said sodium-organo-complex compound.

3. Process according to claim 1 wherein said sodium organo-complex compound is in the form of a melt thereof.

4. Process according to claim 1 wherein said sodium organo-complex compound is employed in said reaction in the form of a solution thereof in an inert organic solvent.

5. Process according to claim 1 which comprises effecting said reaction by passing said sodium organo-complex compound in counter-current flow relationship to said potassium amalgam.

References Cited by the Examiner

UNITED STATES PATENTS

| | | |
|---|---|---|
| 2,741,540 | 4/1956 | Bragdon. |
| 2,923,731 | 2/1960 | Cunningham et al. ___ 260—462 |
| 2,960,450 | 11/1960 | Giraitis et al. _____ 204—59 |
| 2,977,381 | 3/1961 | Roha et al. _____ 260—448 |
| 2,985,568 | 5/1961 | Ziegler et al. _____ 204—59 |
| 2,992,262 | 7/1961 | Sears et al. _____ 260—448 |
| 3,028,323 | 4/1962 | Kobetz et al. _____ 260—462 |

TOBIAS E. LEVOW, *Primary Examiner.*